United States Patent [19]
Gresham et al.

[11] 3,769,145
[45] Oct. 30, 1973

[54] REINFORCED PLASTIC CUSHIONING MATERIAL

[75] Inventors: James T. Gresham; Louis J. Juracek, Jr., both of Appleton, Wis.

[73] Assignee: Kimberly-Clark Corporation, Neenah, Wis.

[22] Filed: May 3, 1971

[21] Appl. No.: 139,751

[52] U.S. Cl................... 161/68, 156/197, 156/289, 156/290, 161/69, 161/122, 161/127, 161/146, 161/148
[51] Int. Cl.............................................. B32b 3/12
[58] Field of Search....................... 161/68, 122, 130, 161/131, 127, 146, 148, 159, 160; 156/197, 290, 306, 380, 272, 273, 274, 289

[56] References Cited
UNITED STATES PATENTS

| | | | |
|---|---|---|---|
| 3,048,514 | 8/1962 | Bentele et al. | 156/289 |
| 3,616,121 | 10/1971 | Freundlich | 161/149 |
| 3,231,454 | 1/1966 | Williams | 161/130 |
| 2,748,048 | 5/1956 | Russell | 156/289 |
| 3,523,050 | 8/1970 | Campbell | 156/289 |

Primary Examiner—Harold Ansher
Assistant Examiner—James J. Bell
Attorney—Daniel Hanlon, Jr., William D. Herrick and Raymond J. Miller

[57] ABSTRACT

Cushioning material is formed of plural plies of thermoplastic sheet material heat bonded together in a particular manner to provide the material useful under moderate and high pressures. A first ply has cellular protrusions extending from one side. The second side carries a second sheet heat bonded to land areas of a grid bordering the openings of the protrusions. The second sheet has a pattern of a heat resistant lacquer on the side fronting the first sheet to prevent overall heat bonding of the land areas with the second sheet. The pattern is such as to provide that some land area surrounding each protrusion opening will be heat bonded while the remaining land area defining the protrusion opening will be free of bond with the second sheet so that air flow may occur between protrusions within the sheet structure.

3 Claims, 4 Drawing Figures

3,769,145

REINFORCED PLASTIC CUSHIONING MATERIAL

BACKGROUND OF THE INVENTION

1. Field of the Invention

The invention relates to cushioning materials and to methods of producing the same. Particularly, the invention is concerned with cushioning materials useful in the shipment of goods where impact loadings are frequently encountered.

2. The Invention with Relation to the Prior Art

Thermoplastic cushioning materials having a single ply from which cellular protrusions extend are previously known. Also, multi-ply thermoplastic sheet material so formed as to enclose and hermetically seal air bubbles are also well-known. The former single ply product requires relatively thick thermoplastic films to absorb the energy of large shock loads; the latter multi-ply type are relatively expensive and subject to damage by puncture of the films resulting in loss of cushioning capability.

This invention is concerned with a means and method of providing a second and relatively thin film of thermoplastic sheet material on a first sheet carrying protrusions in such manner that the two sheets are readily heat bonded in selected areas. The areas are selected to provide that the cellular protrusions in adjacent relationship may have air flow between them without significant material collapse and, additionally, the areas bonded effect a reinforcing of the first film. This latter arrangement permits the use of relatively thin films as the protrusion carrying film.

In the practice of the invention we provide the second sheet with a pattern of a heat resistant component such as a lacquer which resists heat and prevents bonding (in the lacquer zones) between the thermoplastic sheets when such are heat sealed. Thus, a heat sealing operation is easily accomplished by simply exposing an already heated first sheet, as it is being formed with protrusions, to the lacquer carrying second sheet to use the sensible heat of the first sheet to soften the second.

Most thermoplastic materials suitable for forming films may be utilized as either the first or second sheet. Such materials include the polyethylenes, polyesters, polystyrenes, polyurethanes, cellulose derivatives, polyvinyls and the like.

Heat resistant components suitable for forming patterns on the second sheet and resistant without significant deformation to temperatures of 300°F. and above include nitrocellulose base lacquers. Such may have as additives petroleum and natural waxes, oils, silicone resins and the like to aid both coating on the thermoplastic sheet and operative characteristics particularly when heat sealing the sheets. High melting point waxes also have utility.

The invention will be more fully understood by reference to the following detailed description and accompanying drawings wherein.

Figure 1:
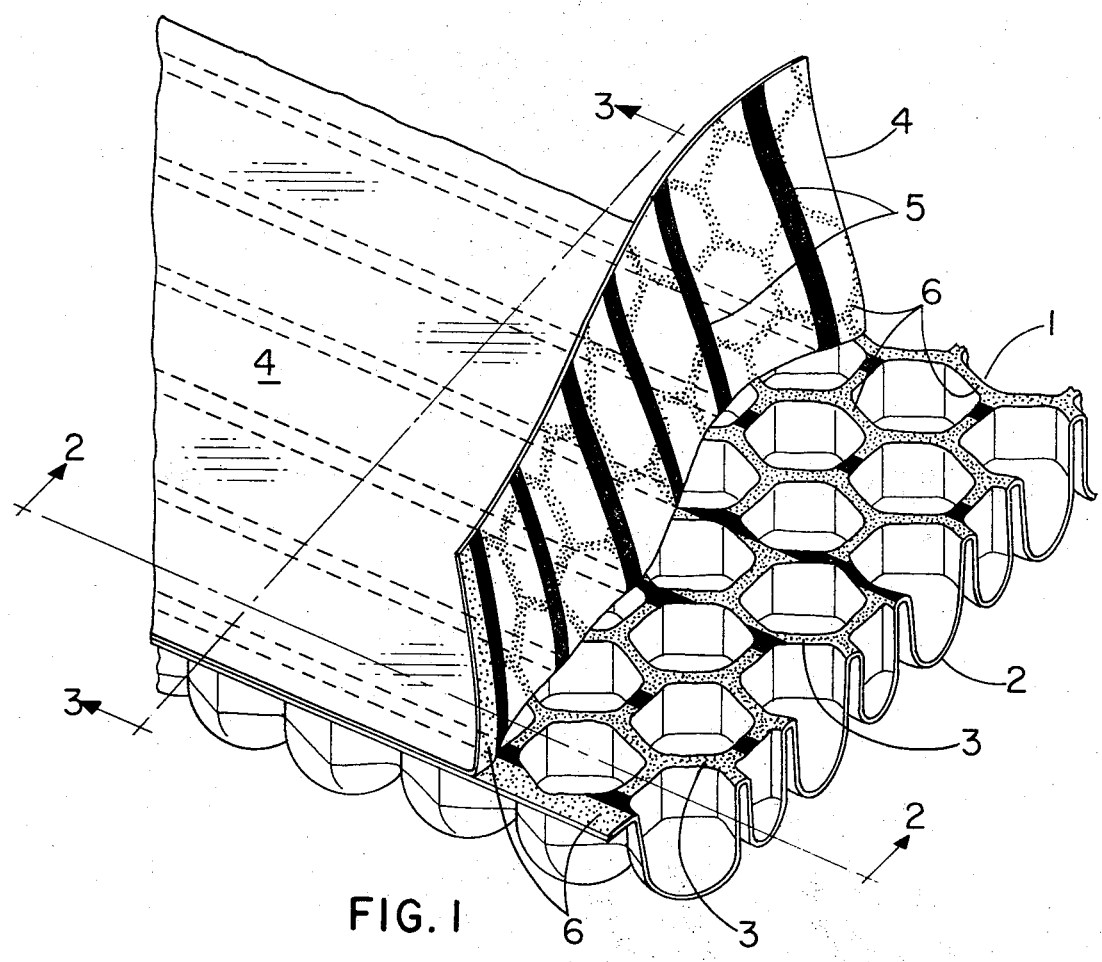
FIG. 1 is a view in perspective of the plastic cushioning material with the upper ply partially folded back to illustrate the structural arrangement of the material.
Figure 2:
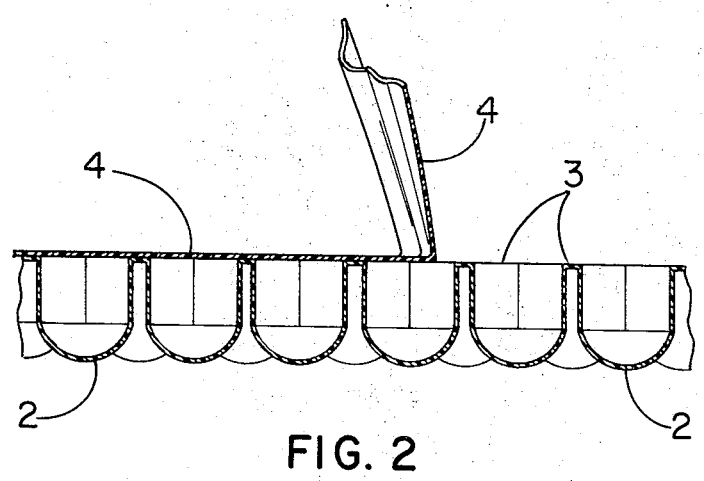
FIG. 2 is a view along line 2—2 of FIG. 1.
Figure 3:
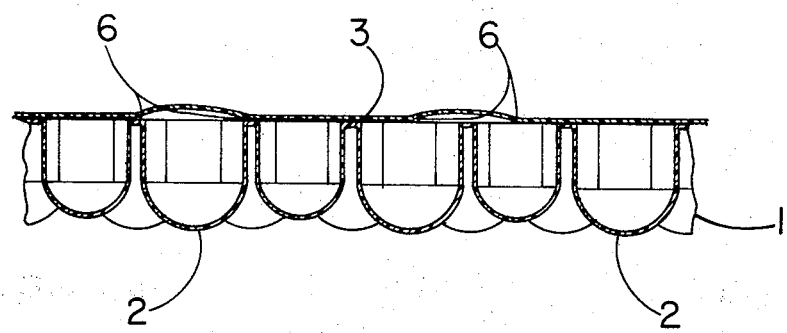
FIG. 3 is a view along line 3—3 of FIG. 1.

Referring now to the drawings more in detail, the numeral 1 in FIG. 1 designates a sheet of low density (0.915 gms/cc) polyethylene material having formed therein a plurality of closely spaced adjacent depending cellular protrusions 2. The upper zones of the cellular protrusions have a planar interconnecting grid 3 forming land areas defining the protrusions. An overlying sheet 4, also of low density polyethylene and having a thickness of about 1 mil, carries a plurality of closely spaced layers 5 of nitrocellulose lacquer on its under surface. Such nitrocellulose lacquer is printed on the sheet 4 and dried. It inhibits heat bonding of the upper sheet 4 to the lower sheet 1. This provides for heat bonds in the zones 6 to secure the sheets together in the land areas.

Figure 4:
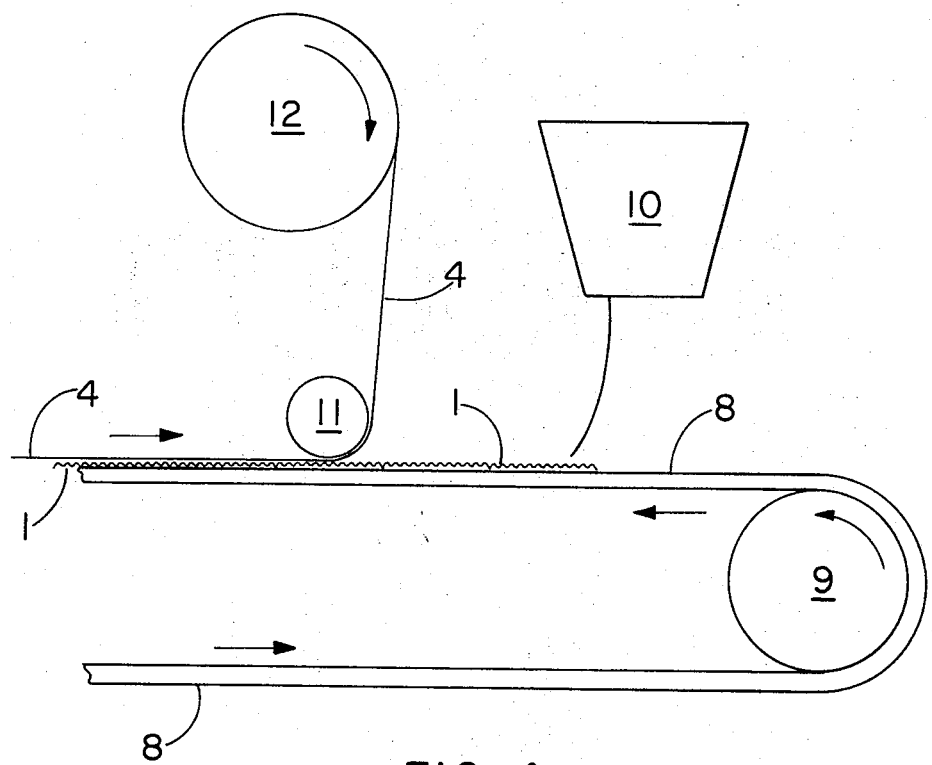
FIG. 4 is a fragmentary view in side elevation of apparatus useful in the formation of the product.

Referring now to FIG. 4, there is shown therein a traveling belt 8 passing over a pulley 9. The belt 8 is formed with cavities for the production of the sheet 1 previously described in connection with FIG. 1. Above the belt is an extruder 10 for the presentation of molten or heat softened thermoplastic resin to the belt. The heat softened resin is applied as indicated, and the belt traveling in the direction of the arrows directs the forming hot thermoplastic resin beneath guide roll 11. Guide roll 11 directs the sheet 4, already described, into abutment with the hot forming thermoplastic sheet 1. The source of the thermoplastic material for the upper sheet 4 is indicated as roll 12. The sheet 4 is rapidly raised in temperature by absorption of the intrinsic heat of the fused thermoplastic resin. This causes the sheet 4 to become molten and unite with the sheet 1 in those areas not protected by the layers 5 of nitrocellulose lacquer. Upon cooling, sheets 1 and 4 are intimately secured together and, upon stripping back (FIG. 1) the sheet 4, the fused zone of resin 6 providing the heat bond is apparent.

The pattern of nitrocellulose lacquer particularly illustrated is that of substantially endless rectangular coating layers in spaced apart relation to provide that some land area surrounding each protrusion opening will be heat bonded to the second sheet while remaining land area defining the protrusion openings will be free of such bonds to provide for air flow between protrusions.

In the specific application described the lacquer layers 5 are suitably one-sixteenth inch wide and three-eighths inch on centers when the cells are of hexagonal shape and have a dimension on a side of about three-eighths inch. The polyethylene for the purpose most suitably is treated on the surface which receives the nitrocellulose to make the nitrocellulose adherent. Such treatments for the purpose are known and include corona discharge treatments. Basically, the layers 5 provide that the attachment of the second sheet around each cellular protrusion will be such that air flow between protrusions readily occurs. Also, in the present instance approximately 75 percent of the land area bounding the protrusions is sealed to the second sheet. As specifically shown in the drawing the heat resistant component extends on the second and upper sheet as a plurality of longitudinally extending coating layers, each having a width significantly less than the width of an opening of said protrusions. Also, the coating layers are spaced apart on centers a distance less than the width of two of said openings and greater than the width of one of said openings.

The method of securing attachment by use of the intrinsic or sensible heat of the fused or molten sheet 1 is a much superior arrangement to procedures involving a re-heating of sheet 1 for attaining sheet attachment. These latter mentioned methods tend to result in sheet distortion.

As many apparently widely different embodiments of this invention may be made without departing from the spirit and scope thereof, it is to be understood that we do not limit ourselves to the specific embodiments thereof except as defined in the appended claims.

We claim:

1. In cushioning material for the protection of goods from impact loadings comprising a first sheet of a thermoplastic film material having closely spaced hexagonal cellular protrusions extending from one side and a grid of interconnecting land areas defining open ends of the protrusions on the second side, the improvement which comprises a second sheet of a substantially air impervious flexible film material closing over the protrusions at the said open ends, said second sheet on the side facing said protrusions having a heat resistant component disposed in a pattern and serving to inhibit heat sealing between the two sheets, and heat seal bonds between said sheets uniting the sheets so that substantially each of the land areas defining protrusions is secured by the heat seal bonds to the second sheet to some degree but substantially none of these land areas defining the protrusions is completely sealed, said heat resistant components extending on said second sheet as a plurality of longitudinally extending coating layers each having a width of about one-sixth of said hexagonal protrusion side dimension and being spaced apart on centers a distance about the same as said hexagonal protrusion side dimension.

2. A cushioning material according to claim 1 in which the heat resistant component is a lacquer.

3. A cushioning material according to claim 1 in which the heat resistant component is selected from the group consisting of nitrocellulose lacquers and high melting point waxes.

* * * * *